United States Patent [19]

Cole

[11] Patent Number: 4,714,347

[45] Date of Patent: Dec. 22, 1987

[54] OPTICAL SMOKE DETECTORS

[76] Inventor: Martin T. Cole, 29 Stafford St., Huntingdale, Victoria, Australia

[21] Appl. No.: 640,345

[22] Filed: Aug. 13, 1984

[30] Foreign Application Priority Data

Aug. 12, 1983 [AU] Australia .............................. PG0822

[51] Int. Cl.[4] ......................... G01N 21/53; F21V 7/04

[52] U.S. Cl. ...................................... 356/339; 362/263

[58] Field of Search .......................... 356/338, 339, 23; 350/613, 614, 616; 362/216, 263; 313/113

[56] References Cited

U.S. PATENT DOCUMENTS 1,275,120 8/1918 Ballman et al. ...................... 313/113

2,501,405 3/1950 Noel ................................ 362/216 X 2,731,577 1/1956 Floyd .............................. 362/263 X 3,457,407 7/1969 Goldberg ........................ 356/338 X 3,563,661 2/1971 Charlson et al. .................... 356/339

3,672,775 6/1972 Fruengel ......................... 356/339 X

*Primary Examiner*—Davis L. Willis

*Assistant Examiner*—Matthew W. Koren

*Attorney, Agent, or Firm*—Learman & McCulloch

[57] ABSTRACT

There is provided a flash reflector for maximizing the intensity of light passing into an air sampling chamber of a smoke detector which enables a reduction in power requirements for the light source. The reflector includes a concave reflecting element to focus light from each infinitesimal cross-sectional element off the arc of ionized gas in a flash tube the light output from the whole length of the tube which is optionally of U-shape being focused into the central region of the sampling chamber.

6 Claims, 5 Drawing Figures

OPTICAL SMOKE DETECTORS

This invention relates to a light source for use in an optical smoke detector of extremely high sensitivity. In particular, a smoke detector as disclosed in my co-pending U.S. application Ser. No. 640,344, filed Aug. 13, 1984, incorporated into this disclosure by reference, may utilise the light source herein.

The present invention is particularly adapted for use with an axial-light absorber as described in my U.S. Pat. No. 4,607,915, issued Aug. 26, 1986, and for use with a sampling chamber disclosed in my co-pending U.S. application Ser. No. 640,344, mentioned above.

The sampling chamber is particularly suited for use with the sampling device or point disclosed in my U.S. Pat. No. 4,608,556, issued Aug. 26, 1986.

Cross-reference is also made to my co-pending U.S. application Ser. No. 663,324, filed Oct. 22, 1984, disclosing optical air pollution monitoring apparatus, and U.S. application Ser. No. 731,674, filed May 7, 1985, disclosing improved solid state anemometers and temperature gauges, all of which are hereby incorporated herein as part of the instant disclosure.

With optical smoke detectors it is necessary to provide a light source of low capacity to irradiate any smoke particles that are drawn into the sampling chamber.

Reduction in energy input lengthens the operational life of the light tube and serves to decrease current drain from a standby battery required to maintain operation in the event of mains failure. Reduction in current drain either increases the life of the battery or reduces the capacity requirement and therefore the cost of the standby battery.

The present invention has for its principal objective the provision of a focusing reflector for a Xenon flash tube, optionally of substantially U-shape configuration, wherein the reflector is configured to match the shape of the Xenon discharge arc, the reflector adapted to be positioned on the side of an air sampling chamber between an ambient air inlet and outlet, the light emission from the arc being focused into the central region of the sampling chamber.

Since the arc of the Xenon flash tube is not a point source, but is distributed diffuse source confined within the inner wall of the tube, it is not possible, by way optical focusing means, to concentrate the entire light reflected by the reflector onto the exact axis of the sampling chamber. However, if the reflector is configured to reflect the light originating from the axis of the interior of the flash tube onto the exact axis of the sampling chamber, it follows that the light coming from off-axis regions of the flash tube will be directed to corresponding off-axis regions of the sampling chamber. Since the internal diameter of the flash tube is small, the said off-axis regions of the sampling chamber will be grouped closely around the axis of the sampling chamber. This close grouping achieves the aim of the invention.

Conveniently, the light is transmitted through an open window in the sampling chamber the perimeter of the reflector body being sealingly attached to the outer surface of the chamber surrounding the window opening to enable circulation of atmosphere within the reflector body when in operation.

The invention will be described in greater detail having reference to the accompanying drawings in which.

Figure 1:
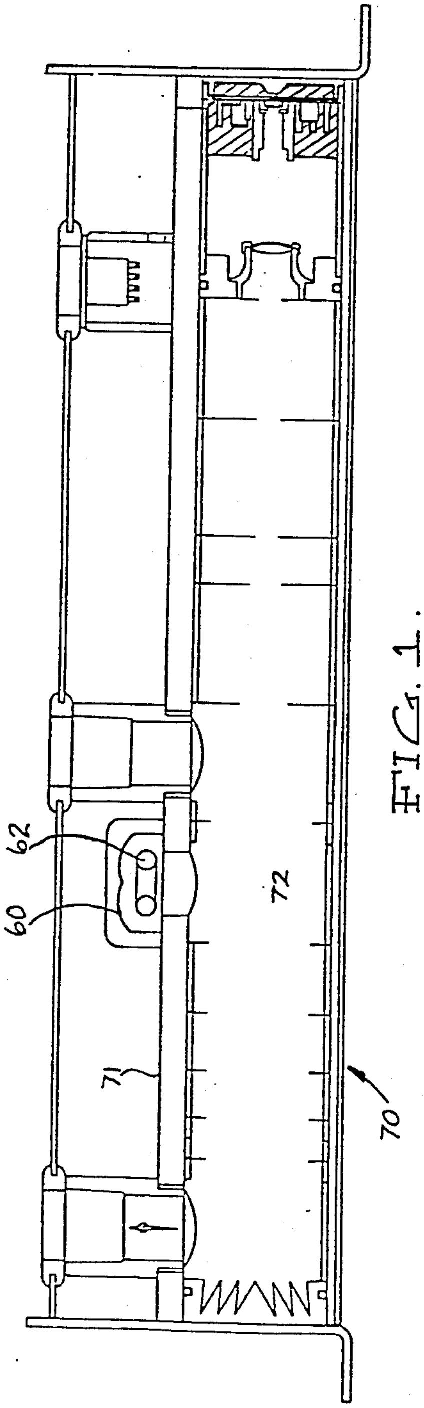
FIG. 1 is a section view of a sampling chamber showing various components including a light reflector.
Figure 2:
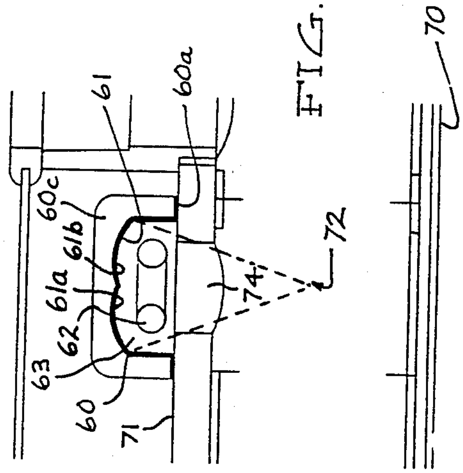
FIGS. 2 and 4 show detailed sectional views of the reflector construction.
Figure 5:
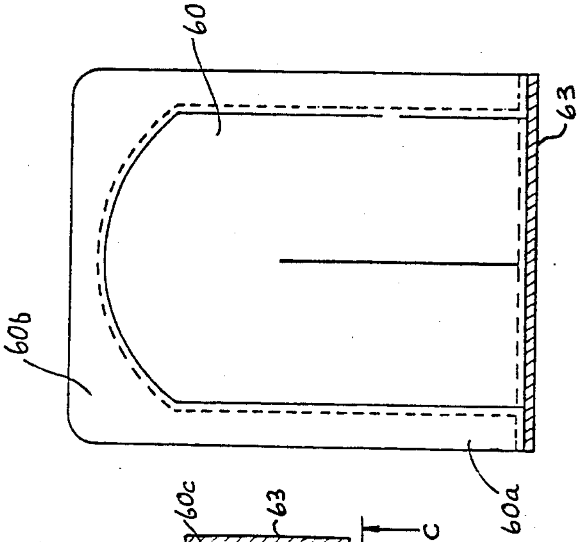
FIG. 5 is a sectional view in line C—C of FIG. 4.
Figure 4:
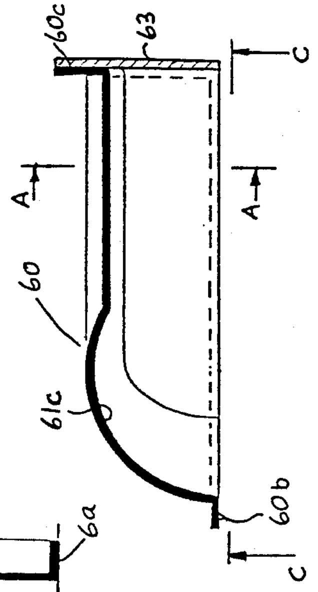
Figure 3:
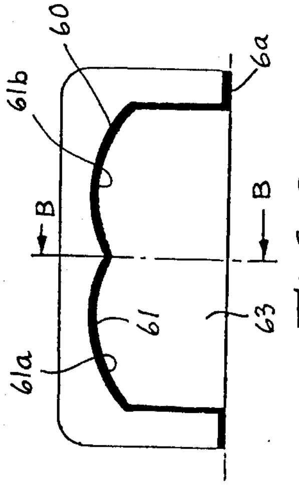
FIG. 3 is a sectional view on line A—A of FIG. 4

The reflector body 60 includes a concave U-shaped reflector element 61 designed to focus light inpinging thereon from each infinitesimal cross-sectional element of a U-shaped Xenon flash tube into a central region 72 of air sampling chamber 70. The reflector element 61 comprised concave reflector surfaces **61*a* and 61*b* (FIGS. 2 and 3) which follow the two straight legs of the U-shaped flash tube 62 and the reflector surface 61*c* (FIG. 4) which follows the curved section of the flash tube 62 which connects together the two straight sections. The body 60 is attached to a flat surface of the chamber 70 by sealing flanges 60*a* and 60*b*. The flat surface 71 of chamber 70 enables simplified sealing and allows the use of an open window 74 for transmission of light into the chamber. The open window allows for circulation of air around the flash tube 62** thereby preventing the build up of potentially damaging ozone in the device.

Alternatively, thelight window 74 may be sealed by clear glass or plastic (not shown) to seal the reflector chamber, whereby the reflector chamber 60 can be filled with an inert gas such as nitrogen. Further, alternatively, a flash tube of quartz glass which prevents the formation of potentially corrosive ozone, can be used. However, the use of an inert gas is costly whereas the latter alternative prevents detection of scattered ultra violet light, thereby altering the calibration of the sampling tube in respect of certain products of combustion.

The reflector 60 is provided with a mounting base 63 which is preferably in the form of a printed circuit board serving as a mounting for the electrode leads of the flash tube 62. Sealing of the circuit board base 63 to the reflector body 60 by sealing flange **60*c* and sealing of the flanges 60*a* and 60*b* to the side of the sampling tube 71** is preferably achieved by a silicone rubber glue. This allows operation of the chamber at other than atmospheric pressure.

The size of the window aperture 74 and the spacing between the light tube 62 and the window together with the focal distance of the concave curved reflector are each optimized to maximise light intensity within the sampling chamber without unduly increasing spurious or stray incident light reflected off the internal walls of the sampling chamber.

The curvature of the reflecting element is developed to follow the "U" shape of the flash tube such that the light output from the whole length of the tube is focused through the flash window into the centre of the sampling chamber.

Accordingly, the use of the reflector of the present invention directly results in a reduction of energy consumption of the lamp by a factor of 2 and without any loss of sensitivity in the detector.

A commensurate extension in lamp life is achieved.

I claim:

1. An optical smoke detector comprising, in combination:
   - a sampling chamber having an axis along which critical light scattering measurements are made;
   - an inlet and outlet port in said sampling chamber for flowing air to be sampled through said sampling chamber along said axis;

means for illuminating air samples flowing along and adjacent to said axis with high intensity light;

said means comprising a window in said sampling chamber between said ports for admitting high intensity light;

discharge means located outside said sampling chamber and adjacent said window for producing high intensity light; and reflector means to reflect the high intensity light from said discharge means through said window and for focusing it onto said axis and into the immediately adjacent region of the sampling chamber;

wherein said reflector means is developed to follow substantially the configuration of the discharge means such that the light output from substantially the whole length of the discharge means is focused into the center of the sampling chamber.

2. An optical smoke detector comprising, in combination:

a sampling chamber having an axis along which critical light scattering measurements are made;

an inlet and outlet port in said sampling chamber for flowing air to be sampled through said sampling chamber along said axis;

means for illuminating air samples flowing along and adjacent to said axis with high intensity light;

said means comprising a window in said sampling chamber between said ports for admitting high intensity light;

discharge means located outside said sampling chamber and adjacent said window for producing high intensity light; and reflector means to reflect the high intensity light from said discharge means through said window and for focusing it onto said axis and into the immediately adjacent region of the sampling chamber in which:

the discharge means comprises a U-shaped tube having straight parallel legs and a semitoroidal link joining said straight parallel legs to each other;

said reflector means comprises two parallel trough shaped regions for focusing light emitted from the respective straight parallel legs of the discharge means onto said axis and the region immediately adjacent thereto.

3. The optical smoke detector of claim 2 in which said reflector means comprises further a longitudinally curved trough region for focusing light emitted from the semitoroidal link onto said axis and the region immediately adjacent thereto.

4. The optical smoke detector of claim 3 wherein the light is transmitted through an open window in the sampling chamber to enable circulation of the tube atmosphere within the reflector body when in operation.

5. Apparatus for detecting impurities such as smoke in a gas, said apparatus comprising (a) means forming a sampling chamber;

(b) inlet and outlet ports spaced from one another for flowing through said chamber gas to be sampled;

(c) a window in said chamber between said ports;

(d) a light source having an elongate component outside said chamber and adjacent said window for admitting into said chamber a first portion of light emitted from said source;

(e) reflector means; and (f) means supporting said reflector means adjacent said source for reflecting into said chamber a further portion of light emitted from said source;

(g) said reflector means including an elongate component adjacent the corresponding component of said source and being configured to reflect into said chamber substantially all light emitted by said source other than said first portion.

6. Apparatus according to claim 5 wherein the supporting means for said reflector means includes a mounting base and peripheral flanges for mounting said reflector means in sealed relation on said sampling chamber.

* * * * *